United States Patent
Karidi

(10) Patent No.: US 6,289,122 B1
(45) Date of Patent: Sep. 11, 2001

(54) INTELLIGENT DETECTION OF TEXT ON A PAGE

(75) Inventor: Ron J. Karidi, Menlo Park, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/293,637

(22) Filed: Apr. 15, 1999

(51) Int. Cl.$^7$ ...................................................... G06K 9/34
(52) U.S. Cl. ........................... 382/176; 382/165; 382/228
(58) Field of Search ................................. 382/173, 176, 382/180, 205, 224, 228, 165; 358/1.9; 707/531

(56) References Cited

U.S. PATENT DOCUMENTS

| | | | |
|---|---|---|---|
| 5,293,430 | 3/1994 | Shiau et al. | 382/423 |
| 5,434,953 | 7/1995 | Bloomberg | 395/139 |
| 5,594,814 | 1/1997 | Fast et al. | 382/254 |
| 5,696,842 | 12/1997 | Shirasawa et al. | 382/176 |
| 5,883,973 | 3/1999 | Pascovici et al. | 382/176 |
| 5,917,963 | * 6/1999 | Chen et al. | 382/291 |
| 5,956,468 | * 9/1999 | Ancin | 358/1.9 |
| 5,987,221 | * 11/1999 | Bears et al. | 358/1.9 |

FOREIGN PATENT DOCUMENTS

| | | | |
|---|---|---|---|
| 471 473 | 2/1992 | (EP) | G06K/9/56 |
| 0516477A2 | 5/1992 | (EP) | H04N/1/41 |
| 0516477B1 | 5/1992 | (EP) | H40N/1/41 |
| 0334937B1 | 8/1993 | (EP) | H04N/1/40 |
| 0810774A2 | 5/1997 | (EP) | H04N/1/40 |
| 0820038A2 | 7/1997 | (EP) | G06T/3/40 |
| 821 318 | 1/1998 | (EP) | G06K/9/20 |

OTHER PUBLICATIONS

IBM Technical Disclosure Bulletin, 1988, No. 7, Armonk, New York.

* cited by examiner

Primary Examiner—Timothy M. Johnson
(74) Attorney, Agent, or Firm—Michael A. Glenn

(57) ABSTRACT

A technique for segmenting an image into text areas and non-text areas in which an image is stored with the following information per pixel: gray scale intensity (4 bits) and an indication of whether the pixel is neutral or color (1 bit). The image, e.g. a scanned RGB image, is converted to 0–15 levels of intensity and has a neutral/color indication bit assigned to each pixel. The technique proceeds in three phases as follows: Tile the image by square blocks, e.g. 6×6 or 8×8 for 600 dpi images, and store information about each block in a buffer; sweep the buffer left to right three tile rows at a time and make a preliminary decision for every tile-block in the middle row; examine the decision made in the previous step in a context block, e.g. a 3×3 block, and make revisions if necessary.

21 Claims, 7 Drawing Sheets

INTELLIGENT DETECTION OF TEXT ON A PAGE

BACKGROUND OF THE INVENTION

1. Technical Field

The invention relates to the use of machine intelligence to detect text on a composite document page that may also contain graphics and images. In particular, the invention relates to computer programs and systems for identifying text and non-text areas in documents.

2. Description of the Prior Art

Electronic image files of printed pages are relatively easy to obtain with the use of a computer and a scanner. A typical image processing system is described by Hisao Shirasawa et al., in U.S. Pat. No. 5,696,842, issued Dec. 9, 1997. Color documents that are scanned-in typically include images, graphics, and text components. A separator is used to divide M×N picture elements according to the type of image in each. Picture elements with black and while values are differentiated from those that are not all-black or all-white. Purpose of such image processing system is to allow for high degrees of image compression because the black and white image areas can be encoded with far fewer bits per pixel than a pixel for a color graphic.

Unfortunately, such prior art techniques are concerned with such issues as compression/decompression and not with specifically identifying the textual elements of the image. While optical character recognition (OCR) systems are known, these systems are not so much concerned with the fast and accurate reproduction of text in a printed page that also contains graphics as they are with the character identification, typically for an all text source.

It would be advantageous to provide an improved text detection technique in which image processing was performed based upon prior knowledge of the nature of the source image components, e.g. text or image, prior to commencing such processing.

SUMMARY OF THE INVENTION

The invention provides a technique for segmenting an image into text areas and non-text areas. The image is stored with the following information per pixel: gray scale intensity (4 bits) and an indication of whether the pixel is neutral or color (1 bit). In the preferred embodiment of the invention, the image, e.g. a scanned RGB image, is converted to 0–15 levels of intensity and has a neutral/color indication bit assigned to each pixel.

The technique proceeds in three phases as follows:

Tile the image by square blocks, e.g. 6×6 or 8×8 for 600 dpi images, and store information about each block in a buffer.

Sweep the buffer left to right three tile rows at a time and make a preliminary decision for every tile-block in the middle row.

Examine the decision made in the previous step in a context block, e.g. a 3×3 block, and make revisions if necessary.

DETAILED DESCRIPTION OF THE INVENTION

Figure 1:
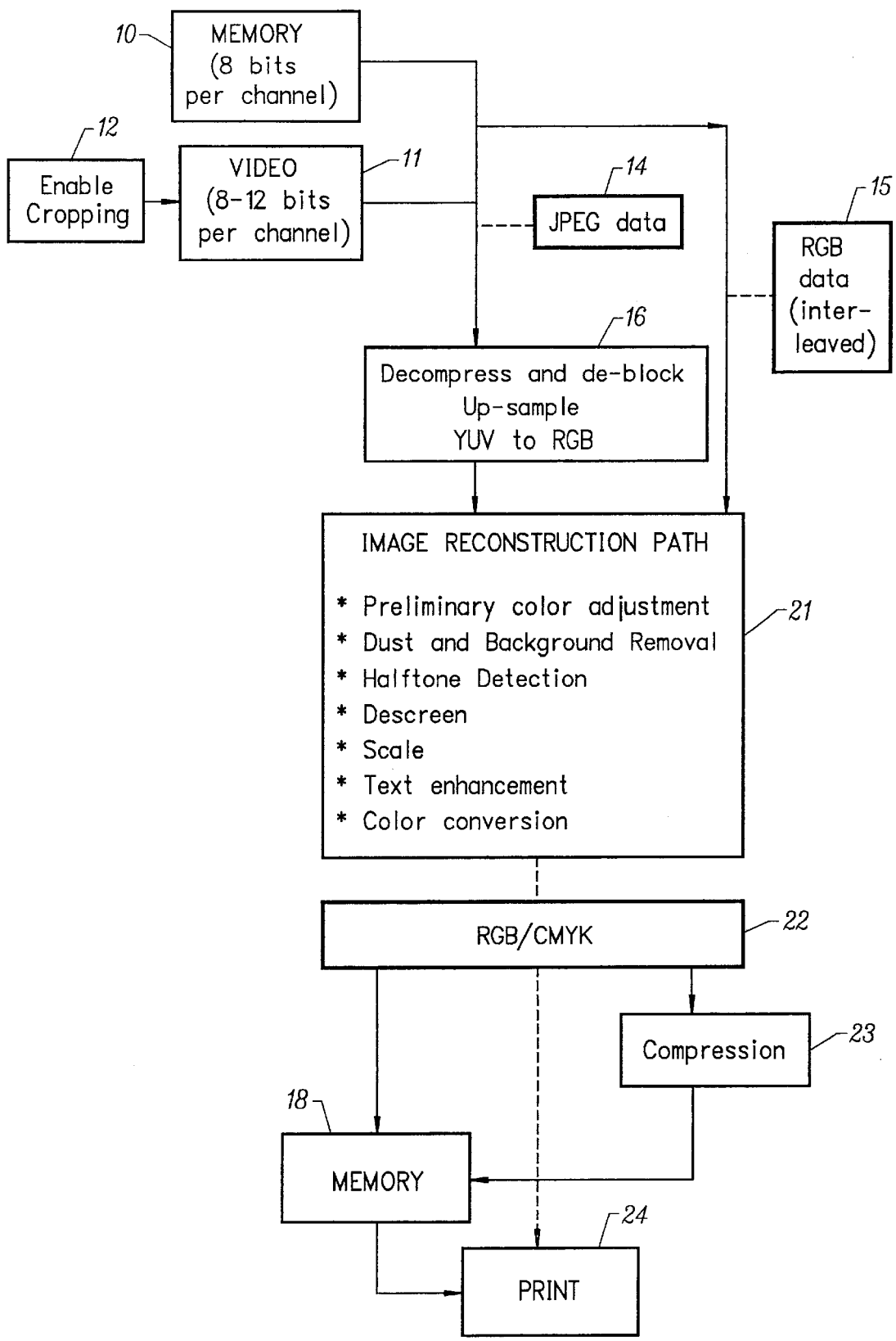
FIG. 1 is a block schematic diagram of an image processing system according to the invention.

FIG. 1 is a block schematic diagram of an image processing system according to the invention. Image information is provided to the system, either as scanner RGB 13 (e.g. in the case of a digital color copier) or from memory 10. Also, a scanned image may be cropped by a cropping function 12, resulting in a video signal 11. The image information may also include JPEG data 14 or interleaved RGB data 15.

The image information is decompressed and deblocked, up-sampled, and converted to RGB as necessary 16. The image information is then provided to an image reconstruction path 21 (discussed in greater detail below in connection with FIG. 2). Image formatting also includes, as appropriate for the input image format, RGB to YUV sub-sampling 17 and JPEG blocking and decompression 18.

The input RGB is converted to CMYK data 22 and may be routed to a print engine 24 and memory 19. Compression 23 is typically applied to reconstructed image information that is to be stored in the memory. The reconstructed image may also be formatted in connection with additional memory 28 with regard to the CMYK printable area 25 or if RGB printing is to take place, in which case RGB/LAB planar data 26 in the form of video 27 are routed as appropriate throughout the system.

Figure 2:
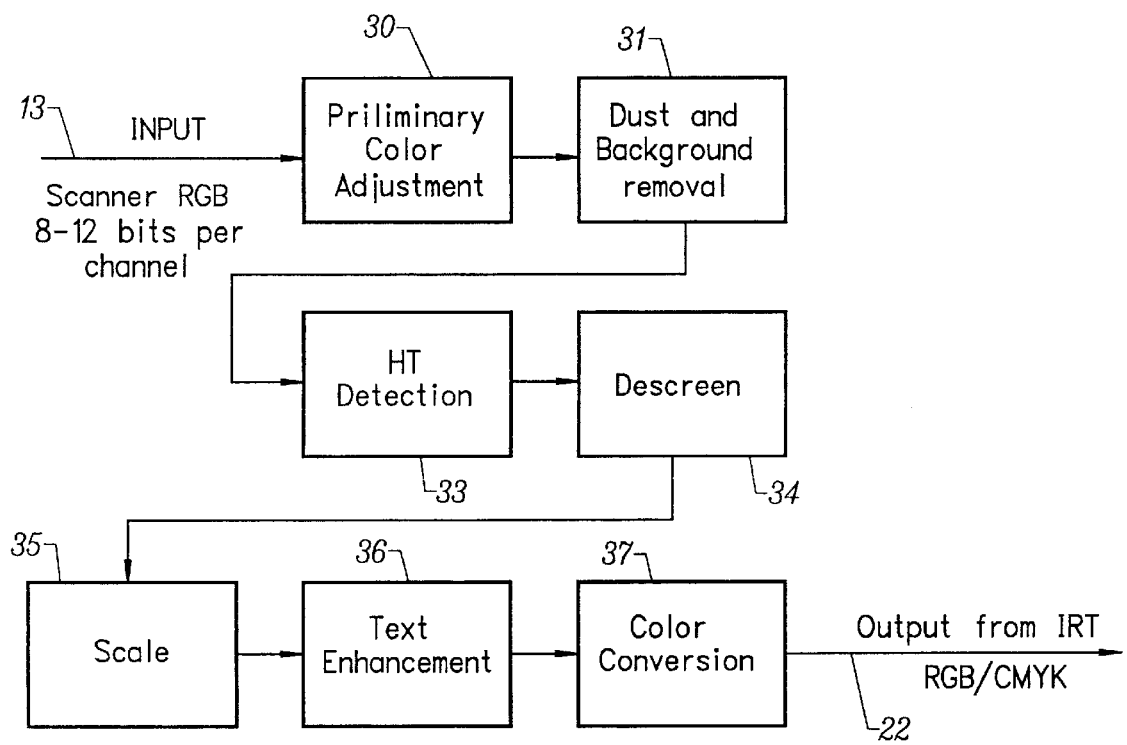
FIG. 2 is a flow diagram of an image reconstruction path according to the invention.

FIG. 2 is a flow diagram of an image reconstruction path according to the invention. Scanner RGB 13 is typically input to the image reconstruction path 21. The data are first subjected to preliminary color adjustment 30 and noise and background removal 31. The image data are next binarized for halftone detection 32. Thereafter, halftone detection 33 is performed and the image is descreened 34 (as is discussed in greater detail below). Thereafter, the image is scaled 35, text is detected 38, text enhancement is performed 36, and the image data are color converted 37, producing output RGB or CMYK 22 as appropriate for the system print engine.

Figure 3:
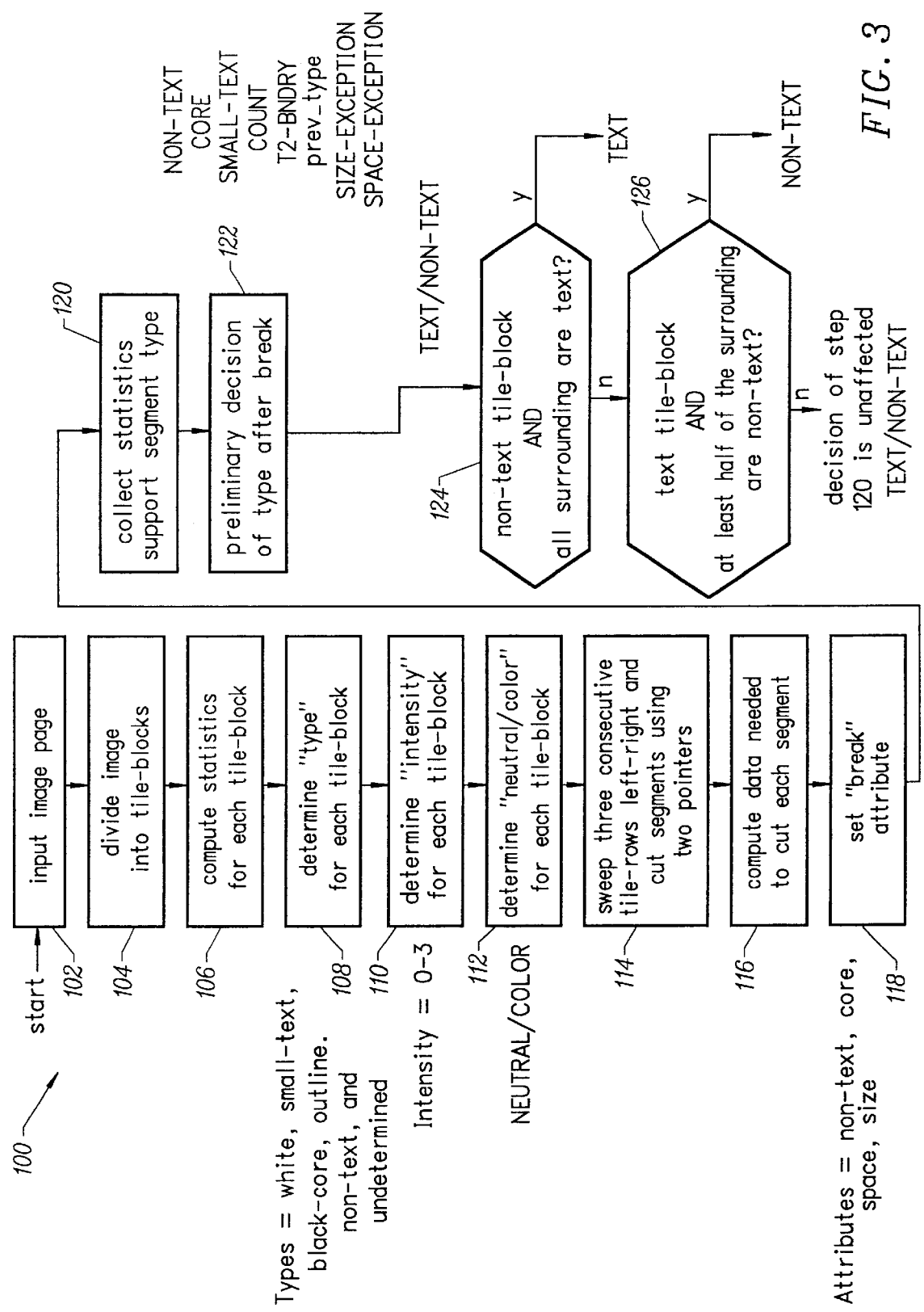
FIG. 3 is a top level flow diagram showing a text/non-text separator according to the invention.

FIG. 3 is a top level flow diagram showing a text/non-text separator according to the invention. A text/non-text separator embodiment of the invention segments images into text and non-text areas, and is referred to herein by the general reference numeral 100. The output of the text/non-text separator 100 is either "TEXT" or "NON-TEXT" for identified tile-blocks in image files.

The text/non-text separator 100 has three major phases of operation. A first phase begins with the input images being stored (102) using 4-bit binary per pixel for a sixteen-level (0–15) grayscale. One bit is used to indicate that the pixel originally had color. In the preferred embodiment of the invention, the image is tiled in square tile-blocks, e.g. six-by-six (6×6) or eight-by-eight (8×8) pixels (104). Various statistics are computed for each such tile-block that are needed later (106). Such statistics and their computer programming labels are listed in Table I below.

TABLE I

Denote:
win_size = the number of rows/cols in a square tile-block
win_width = ⌊win_size/2⌋
win_area = the area of a tile-block (win_size * win_size)
For each tile - block, accumulate:
sum_ink - total amount of ink density in pixels with intensity darker than a given threshold (T1) (where ink density = 15-intensity), where T1 is a function of the number of levels of intensity.
sum_lum - total amount of luminance in pixels with intensity lighter than T1.
darkest - the intensity of the darkest pixel.
lightest - the intensity of the lightest pixel
bndry_size - declare a pixel "light" if its intensity is higher than T2_l (typically 12) and dark if its intensity is less than T2_d (typically 2), count the number of pixels whose upper neighbor has the opposite dark/light attribute + the number of pixels whose left neighbor has the opposite
 - dark/light attribute.
cnt_non_clr - a weighted sum of the number of neutral pixels:
　　if a pixel is neutral and is either dark or light the weight is +2;
　　if a pixel is neutral but not dark and not light the weight is +1;
　　if a pixel is color and is also dark, the weight is (−2); and
　　if a pixel is color and is not dark, the weight is (−1).
cnt_white - the number of white (intensity 15) pixels
cnt_black - the number of black (intensity<2) pixels
cnt_white_rows - the number of rows in window that are "white"
cnt_white_cols - the number of columns in window that are "white"
where a row/column is called "white" if at most 2 pixels in flat row/column are not white (i.e 15).

A threshold level T1 is passed to the text/non-text separator 100 and can be varied by a user to optimize performance. In the preferred embodiment of the invention, the intensity scale for each pixel is fifteen for the whitest and zero for the darkest with the blackest ink. Therefore, the ink density can be computed by subtracting the 0–15 scale intensity from the number fifteen. As used herein, neutral means lacking color, e.g. grayscale. For 6×6 tile-blocks, the win_size=7, and the win_area=49 to allow for overlap between tile blocks for 8×8 tile-blocks, the win_size=9, and the $win_{13}$ area=81. Those skilled in the art will appreciate that other values and sample sizes can be selected when using the invention herein.

Figure 4:
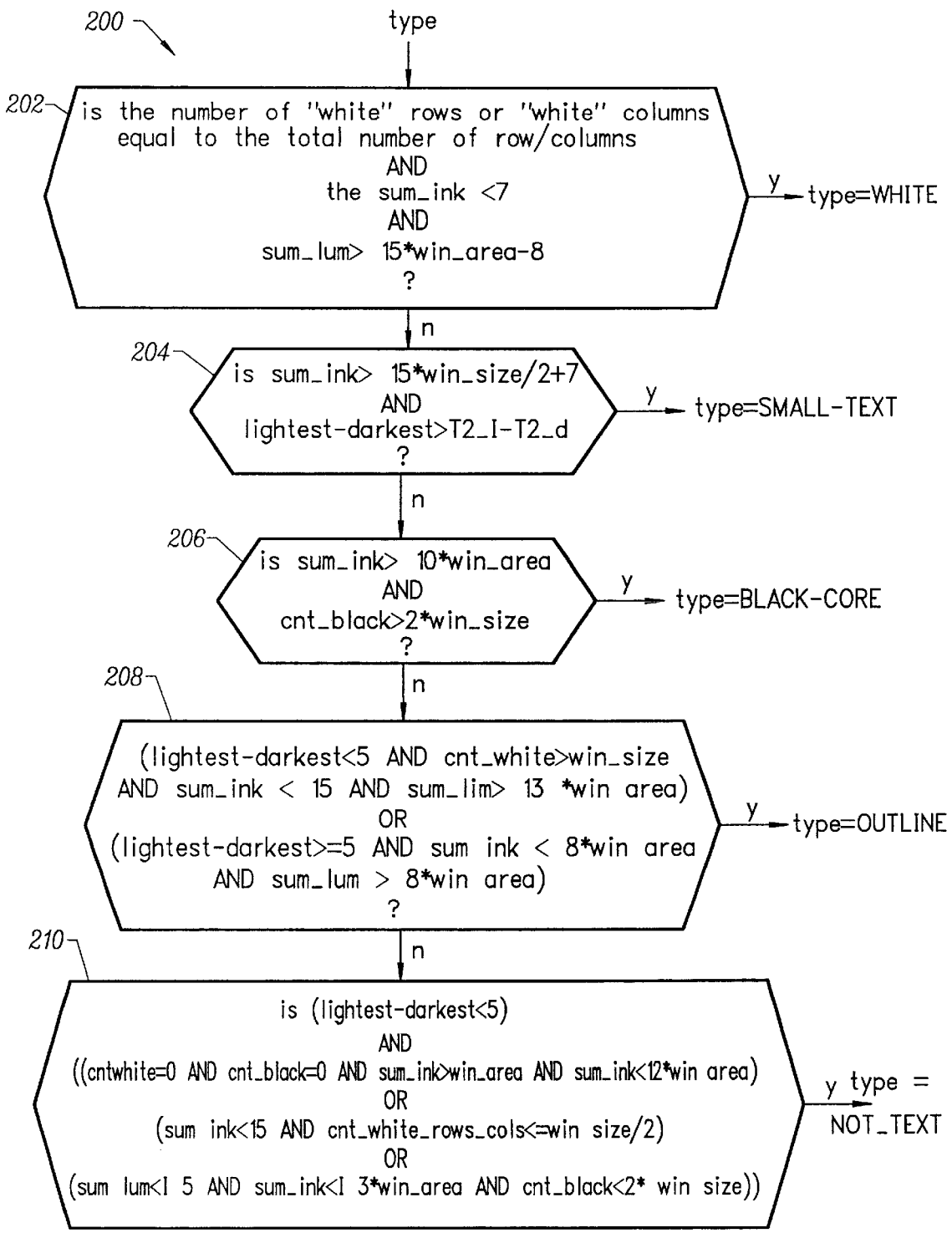
FIG. 4 is a flow diagram showing a type classification technique according to the invention.

Each tile-block is classified as to type (108). FIG. 4 is a flow diagram showing a type classified technique according to the invention. The type pseudocode is provided below in Table II. The possible types output by the type process are listed in Table III.

Codes 0–5 are used for the tile-block types as follows: 0=undetermined; 1=not text; 2=tile-block core; 3=small text; and, 5=white tile-block.

TABLE III

| 0 | undetermined |
|---|---|
| 1 | not text |
| 2 | block core |
| 3 | small text |
| 4 | outline of text |
| 5 | white tile-block |

Figure 5:
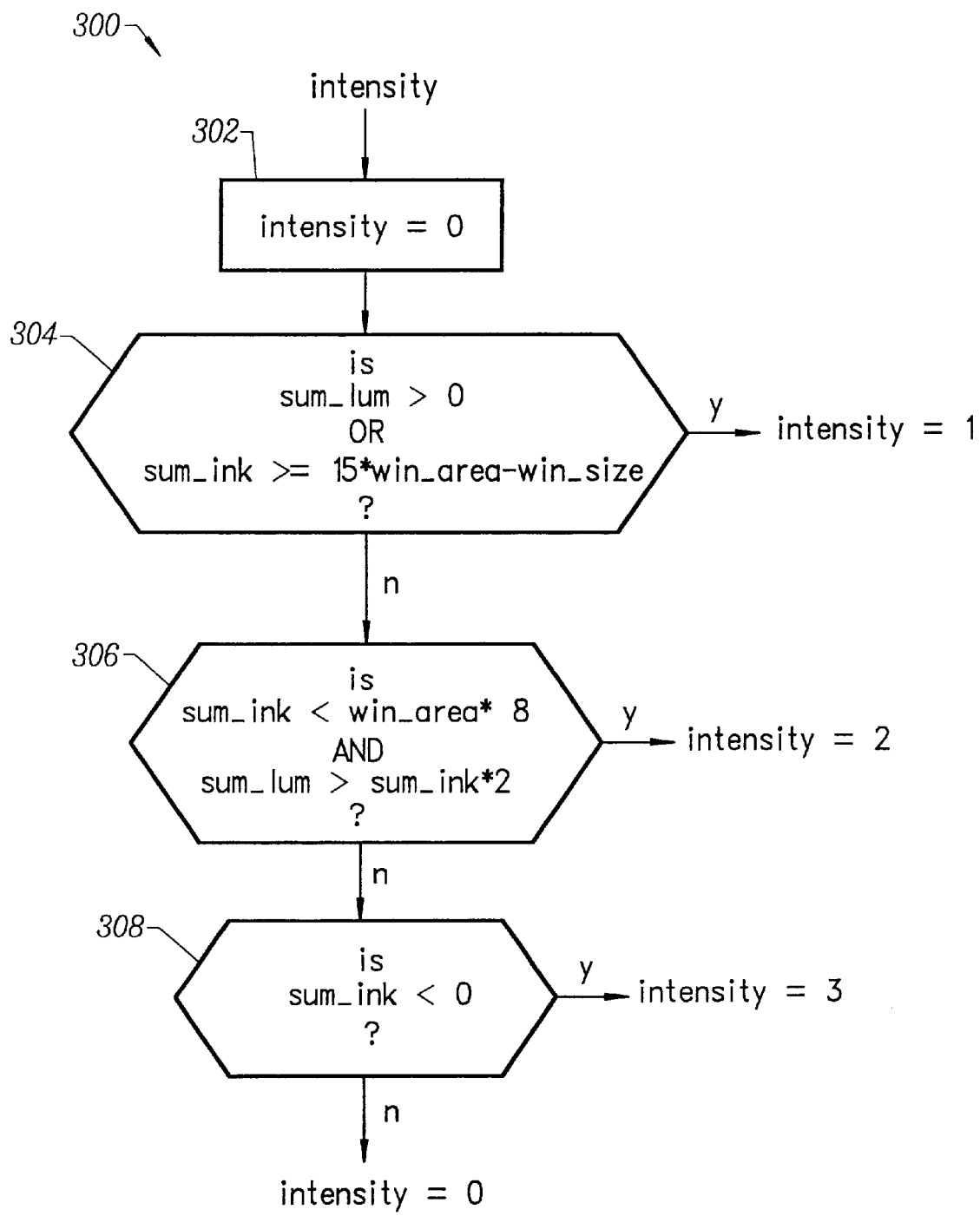
FIG. 5 is a flow diagram showing an intensity classification technique according to the invention.

The intensity for each tile-block is determined and encoded on a 0–3 scale (110). FIG. 5 is a flow diagram showing an intensity classification technique according to the invention. Pseudocode for an intensity classification routine is provided in Table IV.

TABLE II

Type:
If cnt_white_rows=win_size or cnt_white_cols=win_size AND the sum_ink <7 AND sum_lum>15*win_area-8
　　type = WHITE
Else, if sum_ink>15 *win_size/2+7 AND lightest-darkest>T2_l-T2_d
　　type = SMALL_TEXT
Else, if sum_ink>10*win_area AND cnt_black>2*win_size,
　　type = BLACK_CORE
Else, if (lightest-darkest<5 AND cnt_white>win_size AND sum_ink < 15
AND sum_lum>13 *win area) OR
(lightest-darkest >= 5 AND sum ink <8*win area AND sum_lum >8*win area)
　　type = OUTLINE
Else, if (lightest-darkest<5) AND
(
(cntwhite=0 AND cnt_black=0 AND sum_ink>win_area AND sum_ink<12*win area)
OR (sum ink<15 AND cnt_white_rows_cols<=win size/2) OR
(sum lum<l 5 AND sum_ink<l 3*win_area AND cnt_black<2*win size)
)　　type = NOT_TEXT
Else　　type = UNDETERMINED

TABLE IV

Intensity:
Intensity = 0;
If (sum_lum>0 OR sum_ink>=15*win_area-win_size) then {
    Intensity++
    If (sum_ink<win_area* 8 AND sum_lum>sum_ink*2) Intensity++;
    If (sum_ink<0) Intensity++;
}

Still referring to FIG. 3, a determination is made for each tile-block whether it represents neutral or color (112). The pseudocode for such a determination is given in Table V. A single bit code for neutral/color can thereafter be used and associated with each tile-block.

TABLE V

Neutral/Color Indicator:
If (cnt_non_dr + win_width* (win_width+ 1) >= 0) then NEUTRAL
Else COLOR A second phase of the text/non-text separator 100 begins at step 114 of FIG. 3. Once each tile-block has been typed, ranked for intensity, and rated as neutral or color, groups of tile-blocks can be sweeped. A set of three consecutive tile-rows are sweeped from left to right. Each three-row-stripe is cut into segments and a decision is made for each segment.

Such segments are cut-out sequentially by stepping two pointers, a left pointer that marks the beginning of the segment, and a right pointer that marks the segment's end. Each time a segment is cut out, both pointers are advanced to a point just beyond the segment. The right pointer is advanced one tile-block at a time so a decision can be made whether to cut out the segment. If a cut-out is not supported, the right pointer is advanced. Once a segment is cut out, a decision is made as to the type of the tile tile-block corresponding to that segment.

The data listed in Table VI are collected to determine whether to cut out a new segment. This is represented in FIG. 3 as a step 116.

TABLE VI

| | |
|---|---|
| cnt_cir_col | - the number of color tile-blocks in the current column |
| cnt_non_text_col | - the number of non_text tile-blocks in the current column |
| cnt_white_col | - the number of tile-blocks in the current column with a white_rows_cols indicator |

TABLE VI-continued

| | |
|---|---|
| cnt_t1white_col | - the number of tile-blocks in the current column with step 108 type WHITE |
| cnt_non_text | - the number of non_text tile-blocks in the current segment |
| cnt_clr | - the number of color tile-blocks in the current segment |
| cnt_core | - the number of tile-blocks with type BLACK_CORE |

Figure 6:
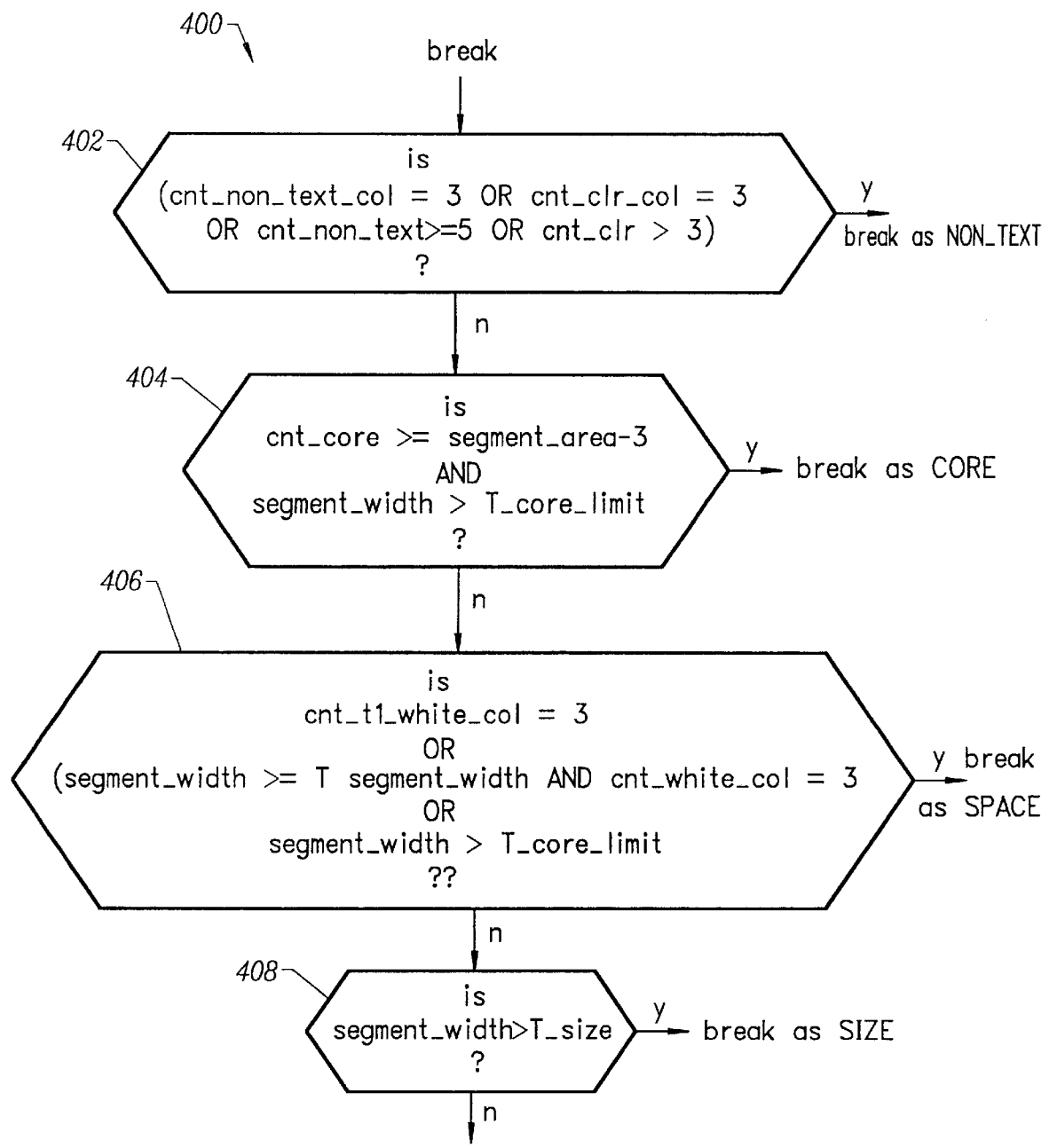
FIG. 6 is a flow diagram showing a break attribute setting process according to the invention.

One of four attributes for the type of tile-blocks is attached in the cut segment (118). FIG. 6 is a flow diagram showing a break attribute setting process according to the invention. The pseudocode for such a break process is given in Table VII. One of four break attributes are set: NON_TEXT, CORE, SPACE, SIZE.

TABLE VII

Breaking:
If (cnt_non_text_col = 3 OR cnt_dr_col = 3 OR cnt_non_text >= 5 OR cnt_cir>3) break as NON_TEXT
Else if (cnt_core >= segment_area-3 AND segment_width > T_core_limit) break as CORE
Else if (cnt_t1_white_col = 3 OR (segment_width >= T segment_width AND cnt_white_col = 3) OR (end-of-line reached) break as SPACE
Else if (segment_width > T_size) break as SIZE A preliminary decision can now be made in phase-2 (120).

The statistics listed in Table VIII are collected to decide the type of the segment (120).

TABLE VIII

| | |
|---|---|
| short_segment | - indication whether segment_width<T_short_segment |
| short_center_row | - indication whether the center row width (not counting white tile-blocks)<T_short_segment |
| sum | - the total sum of (0–3) intensities in the segment |
| cnt_small | - number of tile-blocks with type SMALL_TEXT |
| cnt_outline | - number of tile-blocks with type OUTLINE |
| cnt_t1_white | - the number of tile-blocks with step l-type WHITE. |
| cnt_with_outline_center_row | - number of tile-blocks in the center row that are either SMALL_TEXT or OUTLINE |
| cnt_with_outline | - number of tile-blocks in segment that are either SMALL_TEXT or OUTLINE cnt_bndry - sum of the boundary size values for the tile-blocks in the current segment. |

A preliminary decision as to whether the tile-blocks corresponding to a segment are text or non-text is made (122).

Figure 7:
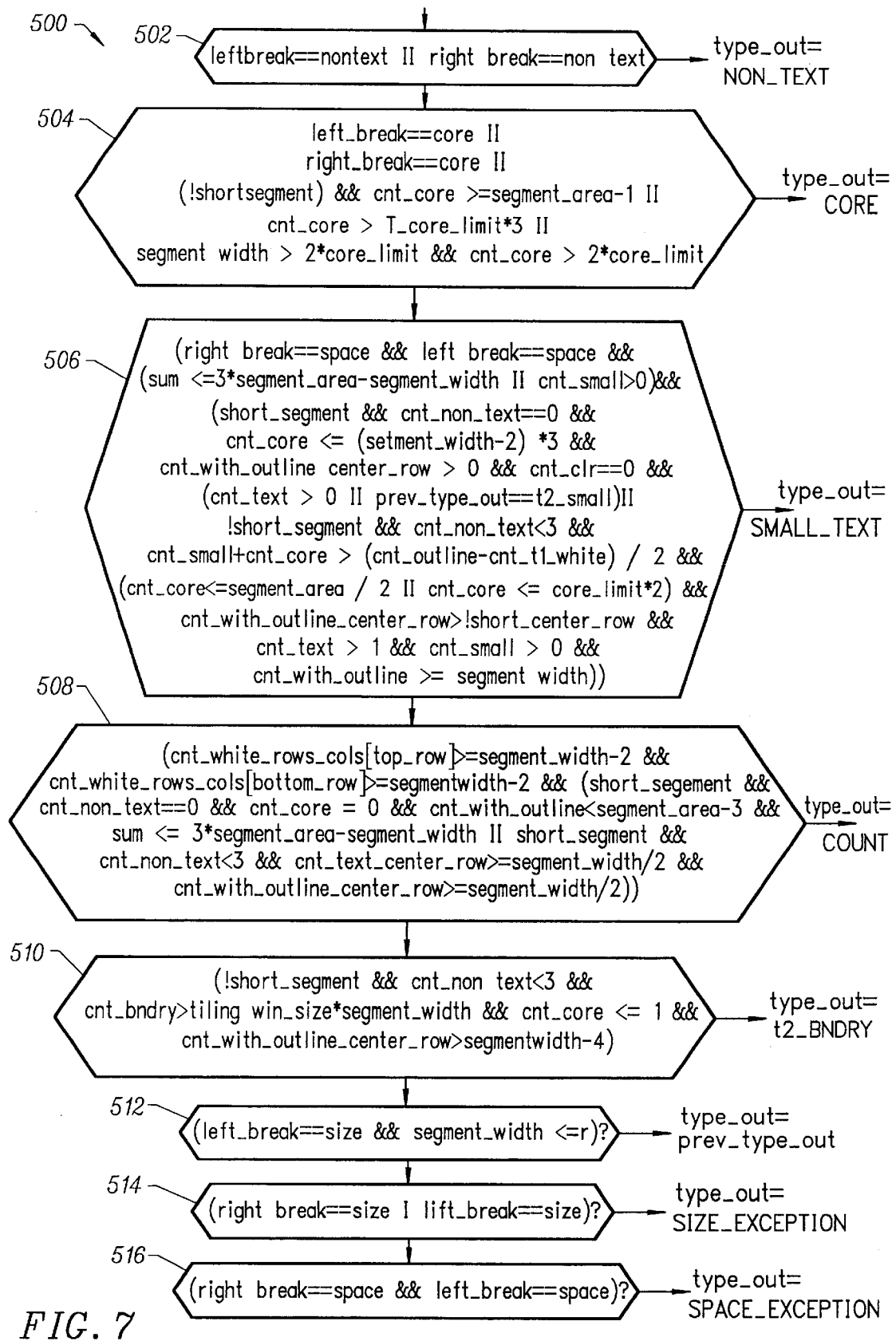
FIG. 7 is a flow diagram showing an after break process according to the invention.

A third phase of the separator 100 may reverse this preliminary decision under certain circumstances. FIG. 7 is a flow diagram showing an after break process according to the invention. The decision of type after break process (122) is represented by the pseudocode of Table IX.

TABLE IX

```
Decision of type after break:
if (leftbreak == non text || right break == non text) type_out = NON_TEXT;
else if (left_break=core || right break == core ||
    (!shortsegment) && cnt_core >= segment_area-1 ||
    cnt_core > T_core_limit*3 ||
    segment width > 2*core_limit && cnt_core >2*core_limit) type_out=CORE;
else if (right break == space && left break == space &&
    (sum <= 3*segment_area-segment_width || cnt_small>0) &&
    (short_segment && cnt_non_text == 0 && cnt_core <= (segment_width-2) * 3 &&
    cnt_with_outline center_row > 0 && cnt_clr == 0 &&
    (cnt_text > 0 || prev_type_out == t2_small) ||
    !short_segment && cnt_non_text < 3 &&
    cnt_small+cnt_core>(cnt_outline-cnt_t1_white) / 2 &&
    (cnt_core <= segment_area / 2 ||
    cnt_core <= core_limit*2) &&
    cnt_with_outline_center_row>!short_center_row &&
    cnt_text > 1 && cnt_small > 0 &&
    cnt_with_outline >= segment width)) type out = SMALL_TEXT
else if (cnt_white_rows_cols[top_row]>= segment_width-2 &&
    cnt_white_rows_cols[bottom_row]>=segmentwidth-2 && (short_segment &&
    cnt_non text == 0 && cnt_core = 0 && cnt_with outline<segment_area-3 &&
sum<=3*segment_area-segment_width j !short_segment &&
    cnt_non_text<3 && cnt_text_center_row>=segment_width/2 &&
    cnt_with-outline_center_row>=segment_width/2)) type out = COUNT;
else if (!short_segment && cnt_non text<3 &&
    cnt_bndry>tiling_win_size*segment_width && cnt_core <= 1 &&
    cnt_with_outline_center_row>segmentwidth-4) type_out = t2_BNDRY;
/* if current segment is at the end of a long strip, it may have a small width, in which case
we
take the previous type */
else if (left_break==size && segment_width<=4) type out = prev_type_out;
else if (right break==size | left_break==size) type_out = SIZE_EXCEPTION;
else if (right break==space && left_break==space) type_out = SPACE_EXCEPTION;
else type out = UNDETERMINED;
```

In a third phase of the separator 100 (124), if the preliminary decision is that a current tile-block is non-text but all around are text, then the current tile-block is identified as also being text. If the preliminary decision is that a current tile-block is text but at least half of those all around are non-text (126), then the current tile-block is identified as also being non-text. Otherwise, the decision in phase-2 (122) is allowed to stand.

The separator 100 concludes with an identification of each tile-block as text or non-text. Subroutines useful in the separator 100 diagrammed in FIG. 3 are illustrated in FIGS. 4–7.

In FIG. 4, a type process 200 attributes a type:WHITE (202) if substantially all the pixels in a tile-block are at or near maximum intensity. A type:SMALL-TEXT is attributed if majority of pixels appear to contain ink and the range of lightest to darkest exceeds a range represented by two thresholds (T2-l and T2-d) that are passed in to separator 100 from a user (204). A type:BLACK-CORE is attributed if, on average, there is significant dark gray in substantially all the pixels (206). A type:OUTLINE is attributed if there is significant contrast and there are large relative differences in the light areas to the dark areas (208). A type:NOT-TEXT is attributed if the tile-block contains pixels having significant grayscale information (210).

In FIG. 5, an intensity process 300 attributes a one-of-four level code for the intensity of each tile-block. The intensity is initially set to zero (302). The intensity is set:1 if as few as one pixel has an intensity greater than threshold T1, or if the total amount of ink in pixels with intensity darker than threshold T1 is greater than a predetermined amount (304). The intensity is set:2 if the average pixel intensity is in the range of 2–8 (306). The intensity is set:3 if there is no ink in any pixel that exceeds threshold T1 (308).

In FIG. 6, a break process 400 sets one of four attributes: NON-TEXT, CORE, SPACE, and SIZE. The process breaks as NON-TEXT if the number of non-text tile-blocks in the current column is three, the number of neutral tile-blocks is three, the number of non-text blocks in the current segment exceeds four, or the number of color tile-blocks exceeds three (402). The process breaks as CORE if the number of tile-blocks with type BLACK-CORE exceeds three less than the segment area, and the segment width exceeds the threshold T_core_limit (404). The process breaks as SPACE if the number of blocks in the current column with type:

WHITE equals three; or the segment width exceeds the threshold T_segment_width and the number of tile-blocks in the current column with a white_rows_cols indicator equals three; or the end-of-line is reached (406).

The process breaks as SIZE if the segment width exceeds the threshold T_size (408).

In FIG. 7, a process 500 begins with a step (502) that attributes type_out as NON_TEXT if the left or right breaks are non-text.

Although the present invention is described herein with reference to the preferred embodiment, one skilled in the art will readily appreciate that other applications may be substituted for those set forth herein without departing from the spirit and scope of the invention. For example, one may vary the sampling pattern of phase one, e.g. by overlapping a block with a previously scanned block to the left or top by one row. Accordingly, the invention should only be limited by the claims included below.

What is claimed is:

1. A method for segmenting an image into text areas and non-text areas, comprising the computer aided steps of:

tiling said image by blocks;

wherein each block is typed as to text content, ranked for intensity, and rated as neutral or color;

storing information about each block in a buffer;

sweeping said buffer a predetermined number of tile rows at a time;

making a preliminary decision whether a portion of the image being swept is a text area or a non-text area of said image for every tile-block in a middle row of said sweep;

examining said preliminary decision in a context block;

making revisions to said preliminary determination as necessary based upon said examination step; and outputting image information which segments said image into text areas and non-text areas.

2. The method of claim 1, wherein said blocks are either of 6×6 or 8×8 square blocks for 600 dpi images.

3. The method of claim 1, wherein said sweeping step sweeps said buffer three rows at a time.

4. The method of claim 1, wherein said context block is a 3×3 block.

5. The method of claim 1, wherein said image is stored with the following information per pixel:

gray scale intensity; and an indication of whether said pixel is neutral or color.

6. The method of claim 1, wherein said image is a scanned RGB image.

7. The method if claim 1, further comprising the step of:

converting said image to M levels of intensity; and assigning a neutral/color indication bit to each pixel.

8. An apparatus for segmenting images into text and non-text areas, comprising:

a buffer for storing input images;

means for tiling said image in tile-blocks;

means for determining an intensity value for each pixel in said image relative to a threshold level;

means for classifying each tile-block as to text content type and intensity; and means for rating each tile-block as neutral or color.

9. The apparatus of claim 8, wherein said types comprise any of undetermined; not text; tile-block core; small text; outline of text; and white tile-block.

10. The apparatus of claim 8, further comprising:

means for sweeping groups of tile-blocks.

11. The apparatus of claim 10, wherein sets of three consecutive tile-rows are swept from left to right; and wherein each three-row-stripe is cut into segments and a decision is made whether a portion of the image being swept is a text area or a non-text area of said image for each segment.

12. The apparatus of claim 10, said sweeping means comprising:

a left pointer that marks a beginning of a segment;

a right pointer that marks said segment's end; and means for advancing both pointers to a point just beyond a segment each time a segment is cut out;

wherein said right pointer is advanced one tile-block at a time so a decision can be made whether to cut out a segment;

wherein said right pointer is advanced if a cut-out is not supported; and wherein a decision is made as to the type of tile tile-block corresponding to said segment once the segment is cut out.

13. The apparatus of claim 10, wherein said means for sweeping implements a break process that sets one of four attributes: NON-TEXT, CORE, SPACE, and SIZE; and wherein said process breaks as NON-TEXT if the number of non-text tile-blocks in a current column is three, the number of neutral tile-blocks is three, the number of non-text blocks in a current segment exceeds four, or the number of color tile-blocks exceeds three; the process breaks as CORE if the number of tile-blocks with type BLACK-CORE exceeds three less than the segment area and the segment width exceeds the threshold T_core_limit; the process breaks as SPACE if the number of blocks in a current column with type:WHITE equals three, the segment width exceeds the threshold T_segment_width and the number of tile-block in a current column with a $white_{13}$ rows_cols indicator equals three, or the end-of-line is reached; and the process breaks as SIZE if the segment width exceeds a threshold T_size.

14. The apparatus of claim 12, wherein an attribute for the type of tile-block is attached in a cut segment.

15. The apparatus of claim 12, further comprising:

means for making a preliminary decision as to whether tile-blocks corresponding to a segment are text or non-text.

16. The apparatus of claim 15, wherein if said preliminary decision is that a current tile-block is non-text but said current tile-block is surrounded by text, then said current tile-block is identified as also being text.

17. The apparatus of claim 15, wherein if said preliminary decision is that a current tile-block is text but at least half of the tile-blocks surrounding said current tile-block are non-text, then said current tile-block is identified as also being non-text.

18. The apparatus of claim 8, wherein said means for classifying identifies a type:WHITE if substantially all the pixels in a tile-block are at or near maximum intensity; a type:SMALL-TEXT if a majority of pixels contain ink and a range of lightest to darkest exceeds a predefined range; a type:BLACK-CORE if, on average, there is significant dark gray in substantially all the pixels; a type:OUTLINE if there is significant contrast and there are large relative differences in the light areas to the dark areas; and a type:NOT-TEXT if said tile-block includes pixels containing significant gray-scale information.

19. The apparatus of claim 8, wherein said means for determining intensity attributes a one-of-four level code for intensity of each tile-block, wherein intensity is initially set to zero; the intensity is set:1 if as few as one pixel has an intensity greater than threshold T1 or if the total amount of ink in pixels with intensity darker than threshold T1 is greater than a predetermined amount; the intensity is set:2 if the average pixel intensity is in a middle range; and the intensity is set:3 if there is no ink in any pixel that exceeds threshold T1.

20. A method for segmenting an image into text and non-text areas, comprising the steps of:

tiling said image by blocks to classify pixel information therein;

typing each tile-block for text content;

ranking each tile-block for intensity;

rating each tile block as neutral or color;

sweeping said image to determine the identity of text areas and non-text areas therein; and revising said determination as necessary in accordance with a predetermined scheme.

21. The method of claim 20, wherein said tiling step overlaps a tile-block with a previously scanned tile-block to the left or top by one row.

* * * * *